United States Patent [19]

Takumi et al.

[11] Patent Number: 4,675,866
[45] Date of Patent: Jun. 23, 1987

[54] BROADBAND NETWORK SYSTEMS

[75] Inventors: Kenta Takumi; Hidenori Sakamoto, both of Tokyo, Japan

[73] Assignee: NEC Corporation, Tokyo, Japan

[21] Appl. No.: 726,459

[22] Filed: Apr. 23, 1985

[30] Foreign Application Priority Data

Apr. 24, 1984 [JP] Japan .................................. 59-81233
May 29, 1984 [JP] Japan ................................ 59-107440

[51] Int. Cl.$^4$ ............................................. H04J 1/10
[52] U.S. Cl. ...................................... 370/124; 370/85
[58] Field of Search .................... 370/124, 71, 73, 75, 370/85; 340/825.5, 825.51

[56] References Cited

U.S. PATENT DOCUMENTS

| 3,864,521 | 2/1975 | De Long | 370/71 |
| 4,519,074 | 5/1985 | Basile | 370/124 |
| 4,535,450 | 8/1985 | Tan | 370/88 |

Primary Examiner—Douglas W. Olms
Attorney, Agent, or Firm—Sughrue, Mion, Zinn, Macpeak & Seas

[57] ABSTRACT

A specific channel CRF which sends back signals of a specific channel but permits bidirectional free pass of signals of the other channels is inserted at an intermediate point of a transmission path. Furthermore, a baseband network and an internetwork connecting device are connected to a broadband transmission path for effecting communication between baseband networks by utilizing the internetwork connecting device when communication distance is extended.

2 Claims, 14 Drawing Figures

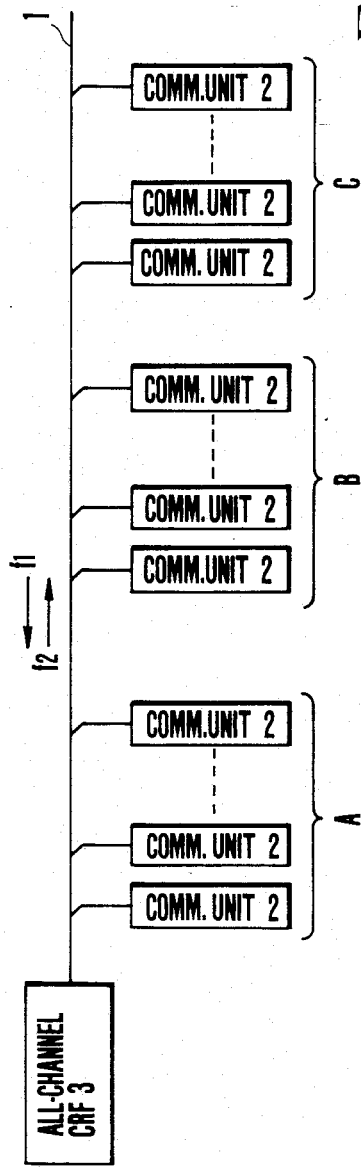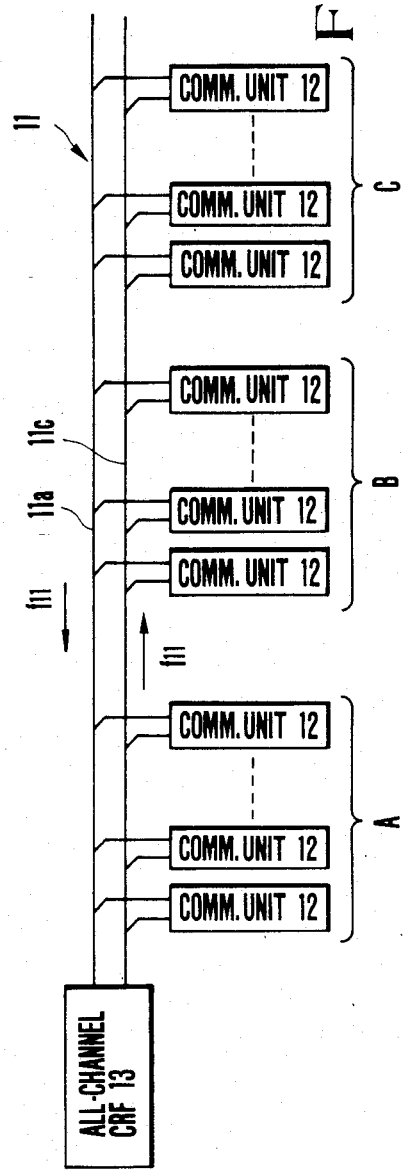

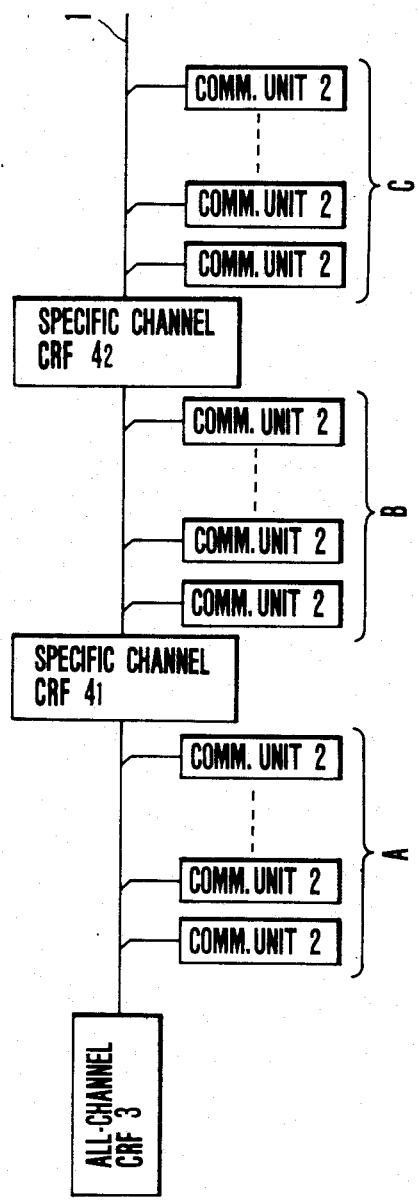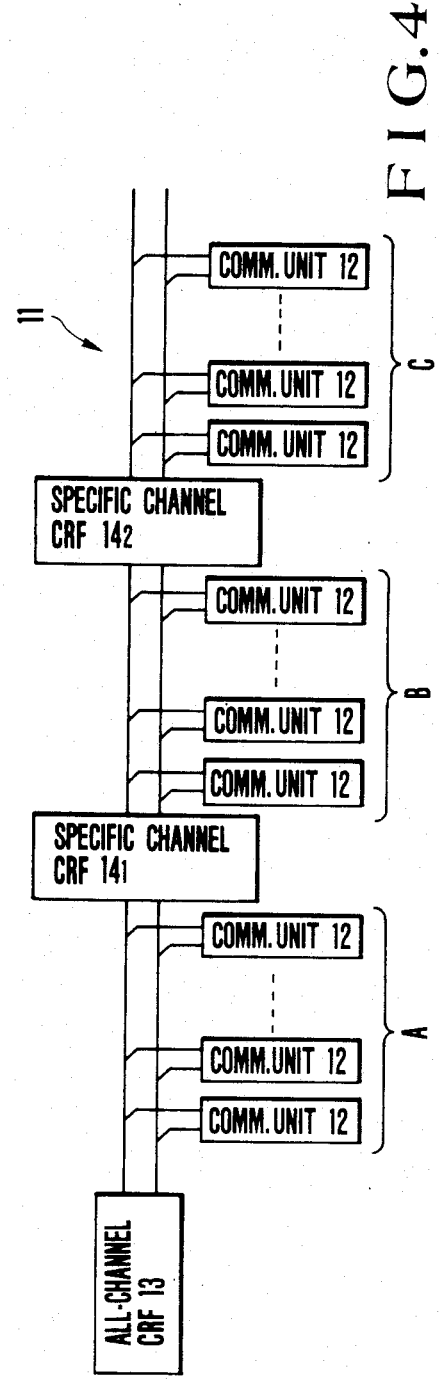

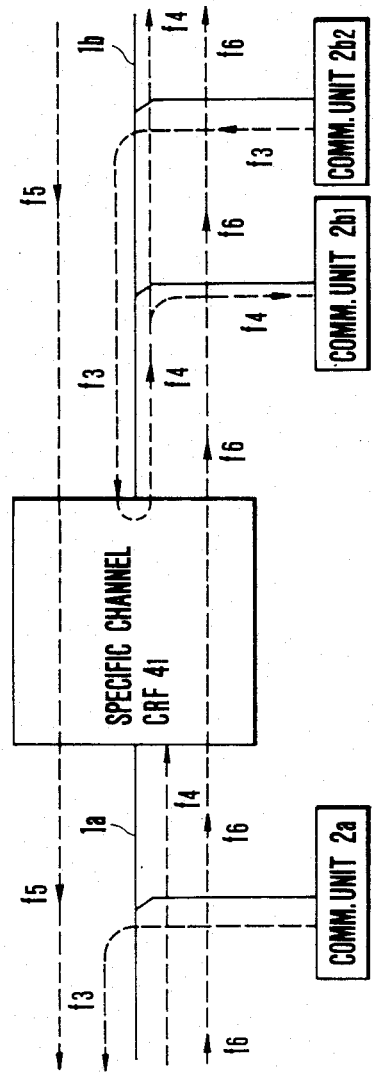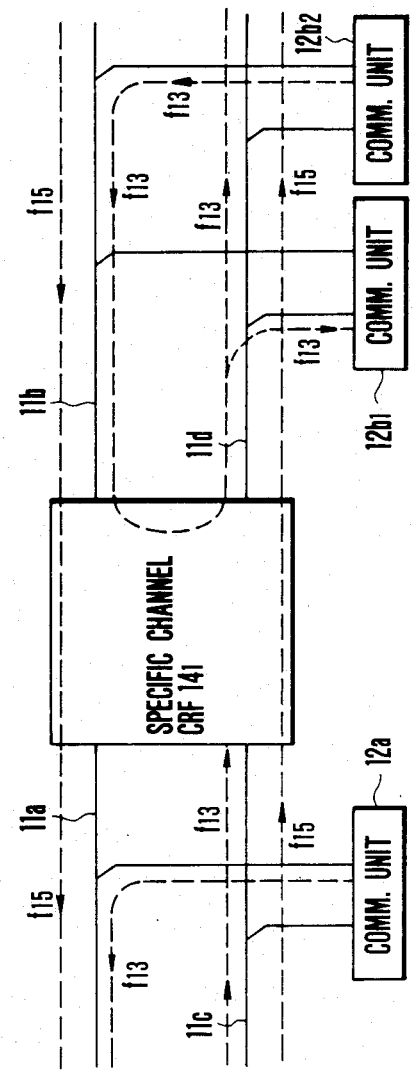

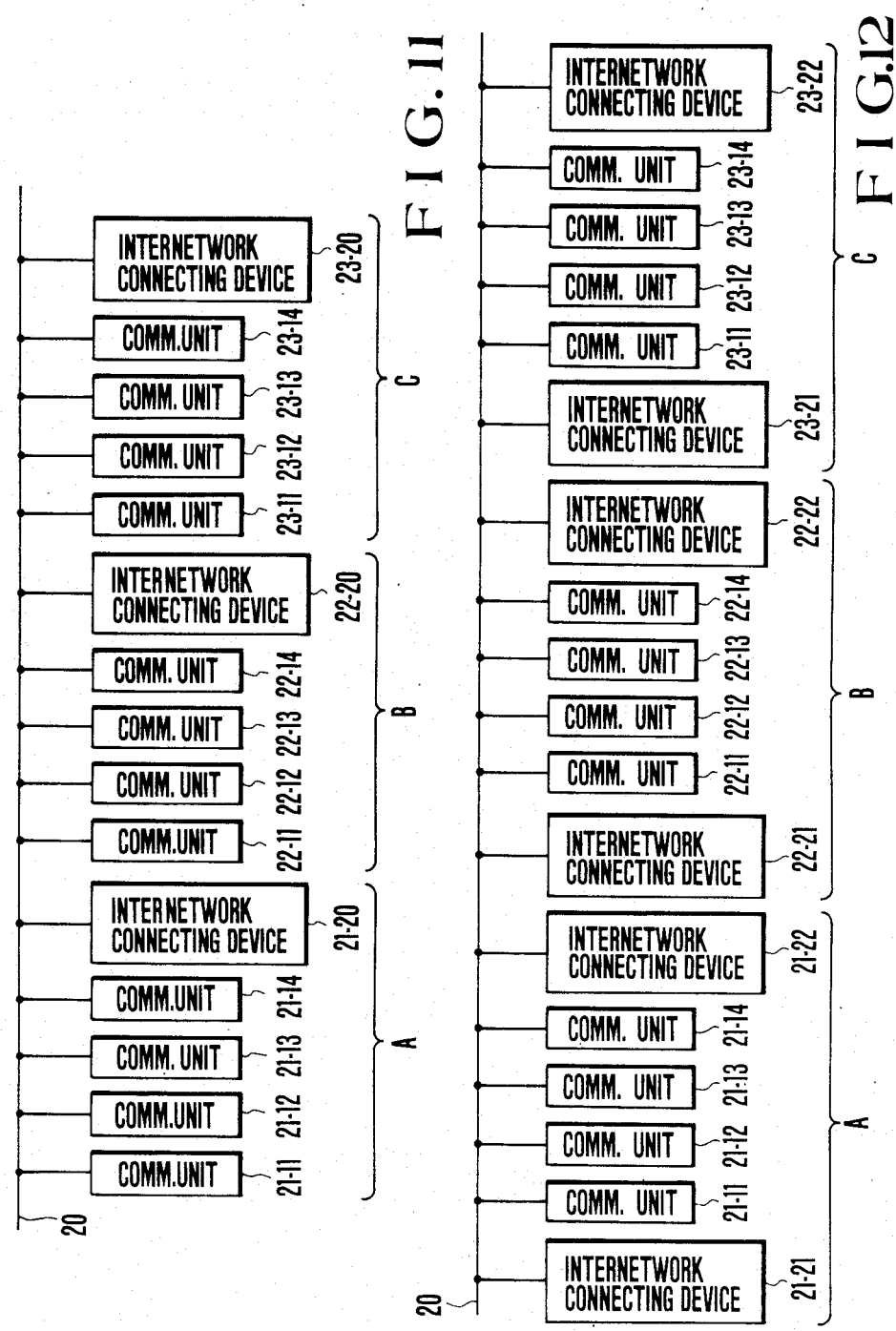

BROADBAND NETWORK SYSTEMS

BACKGROUND OF THE INVENTION

This invention relates to a broadband network system wherein a single transmission path is used commonly for a plurality of channels and one or more channels are used for effecting transmission of signals of the baseband network.

In recent years, a broadband system in which a plurality of communication units are connected in parallel to a common transmission path has become noted in the art. Among references regarding this technique may be mentioned a paper of the title "Broadband coaxial local area networks", Computer Design, July, 1980 and a paper of the title "Broadband technology magnifies local networking capability", Data Communication, Feb. 1980.

Among the broadband systems are included a single line system wherein a single coaxial cable is used in common for a transmission line and a receiving line by employing different channel frequencies, and a two-line system wherein signals are transmitted through two coaxial cables by employing the same channel frequency for the transmission line and the receiving line.

As shown in FIG. 1, according to the single line system, a plurality of communication units 2 are connected in parallel with a single transmission path 1 and an all-channel central retransmission facility (hereinafter referred to as CRF) 3 for sending back all channels is connected to one end of the transmission path 1. When a high frequency transceiver contained in each communication unit sends out a signal having a frequency f1, which is a representative of various assigned frequencies, the transmitted signal is converted to a receiving signal having a frequency of f2 by the CRF 3 and the receiving signal is returned to be received by a radio frequency modem (RF modem) of another communication unit to perform communications.

According to the two-line system, as shown in FIG. 2, a plurality of communication units 12 are connected in parallel with two transmission paths 11 including a return channel transmission path 11a and a forward channel transmission path 11c, and an all-channel CRF 13 for sending back all channels is connected to one end of the transmission paths 11. When an RF modem in each communication unit 12 transmits a signal of a (representative) frequency of f11 to the return channel transmission path 11a, the signal of the frequency f11 is amplified by the CRF 13 and then returned to the forward path 11C to be received by an RF modem of another communication unit thereby performing communications.

An existing broadband transmission path comprises a plurality of frequency divided channels and has a length of several kilometers to several of tens of kilometers.

In such a long transmission path, the probability of mutual communications between remotely separated communication units is lower than that of closely adjacent communication units so that there is a tendency of constituting communication networks i.e., areas denoted at reference characters A, B and C in FIG. 1 in which mutual communications are made between relatively close communication units. Where the transmission path becomes so long that the amount of attenuation of signals increases, repeaters are installed, in some applications, at intermediate points of the transmission path.

Known baseband transmission systems include carrier sense multiple-access with collision detection (CSMA/CD) system and a carrier sense multiple access (CSMA) system. Since each of these systems utilizes a probability method of acquiring priority of transmission by avoiding collision of a plurality of signals, the time constraints on parameters regarding transmission is severe so that it is necessary to limit the length of the transmissions path to a value of only several kilo meters which is smaller than that of the broadband transmission path.

In this manner, the broadband network system can employ a single transmission path over a relatively long distance. But as the distance between the communication unit 2 or 12 and the all-channel CRF 3 or 13 increases, the propagation delay time increases correspondingly so that when communications are made in a CSMA/CD system, typically examplified by Ethernet wherein constraints on the propagation time delay exist, there is a defect in that the communications of this type can be made only between the communication units near the CRF.

Moreover, there is a defect in that in the baseband network on a broadband network system, communications over a relatively long distance can not be made because of constraints on the propagation delay time.

SUMMARY OF THE INVENTION

A principal object of this invention is to improve communications in broadband network systems.

It is an object of this invention to provide a novel broadband network system capable of improving communications between communication units within a specified area regardless of the distance from the CRF even when communications are made with a communication system having constraints on the propagation delay time.

It is another object of this invention to provide a broadband network system capable of improving communications between different areas by extending the usable distance beyond a distance attainable with a baseband network, with a simple construction.

According to one aspect of this invention, there is provided a broadband network system comprising: a plurality of communication units connected in parallel to a communication path in a frequency multiplexed communication system; an all-channel CRF for sending back on all channels, connected to one end of the communication path, for receiving return signals sent from the transmission units and converting the received return signals into forward signals sent to the other end of the communication path; a specific network area contained in the frequency multiplexed communication system and having constraints on a permissible value of propagation delay time for communications between communication units in the area; and an intermediate specific channel CRF, located at an intermediate point of the transmission path at which a propagation delay time for the communication units of the specific network area is permissible, for converting a specific return signal sent from the other end of the transmission path into a specific forward signal and returning the same to the other end of the transmission path, and for preventing either a specific return signal supplied from one end of the transmission path from being sent to the other end of the transmission path or a specific return signal supplied from the other end of the transmission path from being sent to the one end of the transmission path.

According to another aspect of this invention, a broadband transmission system comprising: a broadband transmission path utilized by a plurality of baseband networks through different channels; and at least one internetwork device, located in each area of the plurality of baseband networks, for interconnecting the network areas on the broadband transmission path through a channel different from that used by the baseband of the broadband transmission path.

BRIEF DESCRIPTION OF THE DRAWINGS

In the accompanying drawings:

FIGS. 1 and 2 are block diagrams showing the construction of prior art one line type and two-line type broadband network systems;

FIGS. 3 and 4 are block diagrams showing preferred embodiments of the broadband network system according to this inventions;

FIGS. 5 and 6 are block diagrams useful to explain the operation of the broadband network systems shown in FIGS. 3 and 4;

FIGS. 11 and 12 illustrate different embodiments of this invention for interconnecting baseband network areas.

DESCRIPTION OF THE PREFERRED EMBODIMENTS

Figure 7:
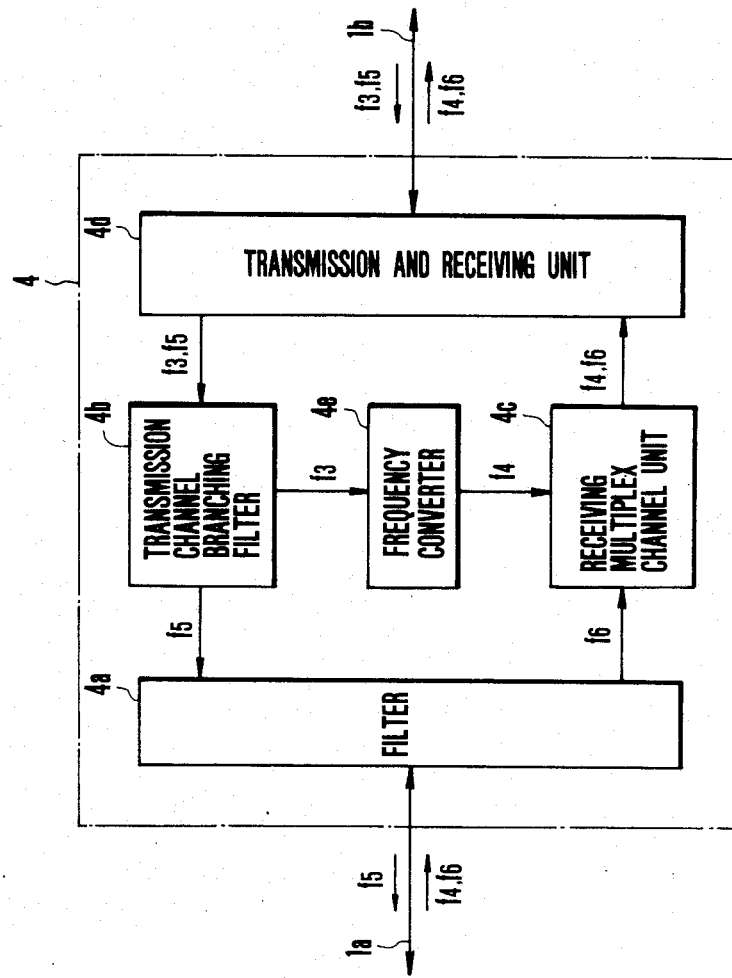
FIGS. 7 and 8 are block diagrams showing details of intermediate CRFs for sending back of a specific channel.

In a preferred embodiment of the one line type broadband network system of this invention shown in FIG. 3, elements corresponding to those shown in FIG. 1 are designated by the same reference characters. The system shown in FIG. 3 comprises intermediate specific channel CRFs $4_1$ and $4_2$ for send back of a specific channel provided for communication units in specific network areas B and C, respectively.

The specific channel CRF $4_1$ is installed in the transmission path at a position at which the CRF $4_1$ is closer to the all-channel CRF 3 than is a communication unit closely adjacent to the CRF 3 in the communication area B. At the position, a propagation delay time for the communication units in the specific network or communication area B is permissible. The CRF $4_1$ functions to convert a transmission signal (return signal) of a specific channel supplied from the communication area B into a receiving signal (forward signal) of a specific channel and then sends back the receiving signal to the communication area B. Further, the CRF $4_1$ permits the transmission and receiving signals in other channels to bidirectionally pass freely. The specific channel CRF $4_1$ is also constructed so as not to send a transmission signal of a specific channel supplied from the communication area B to the communication area A, and not to send a receiving signal of the specific channel supplied from the communication area A to the communication area B. The specific channel CRF $4_2$ is constructed similarly and functions in the same manner as the specific channel CRF $4_1$.

The operation of the system shown in FIG. 3 will be described with reference to FIG. 5 in which two communication units in the communication area B are designated by $2b_1$ and $2b_2$, a single communication unit in the communication area A is designated by $2a$, the frequency of a transmission signal of a specific channel sent out from each communication unit is denoted by $f_3$, and the frequency of a receiving signal produced by sending back the transmission signal by the CRF 3 or the specific CRF $4_1$ is denoted by $f_4$. The frequencies of the transmission signals of the channels other than the specific channel are represented by $f_5$ and the frequencies of the receiving signals of the channels other than the specific channel is represneted by $f_6$.

In the system described above, when the communication unit $2b_2$ sends out a specific channel transmission signal of frequency $f_3$, this signal will be returned by the specific CRF $4_1$ as a specific channel receiving signal of frequency $f_4$ and received by the communication unit $2b_1$. In this case, the propagation delay time between transmitting and receiving points is equal to the sum of the propagation delay time between the communication unit $2b_2$ and the specific channel CRF $4_1$ and the propagation delay time between the specific channel CRF $4_1$ and the communication unit $2b_1$. However, since the communication units in the same area are relatively closely located, the propagation delay time between respective communication units and their specific channel CRF is relatively small. For this reason, the propagation delay time between transmission and receiving points is also small so that it is possible to limit this delay time to be smaller than a permissible value.

According to the prior art technique, as the distance to the CRF 3 increases, the propagation delay time also increases so that the transmission path of the type described above could not be used for a communication system in which constraints are imposed on the delay time. But the specific channel CRF inserted in the transmission path 1 according to this invention permits communications under the constraints. Since the transmission signal of frequency $f_3$ sent out from the communication unit $2b_2$ will not be sent to the communication unit $2a$, no interference occurs in the communication unit $2a$. Accordingly, the transmission signal sent out from the communication unit $2a$ is converted into a receiving signal of frequency $f_4$ by the CRF 3 and the receiving signal would not be sent to the communication units $2b_1$ and $2b_2$, avoiding interference of the receiving signal with these communication units. Since the transmission and receiving signals of the channels other than the specific channel can bidirectionally pass through the specific channel CRF $4_1$ freely, communications can be made in the same manner as in the prior art system regardless of the presence or absence of the specific channel CRF. Accordingly, it is convenient to perform communications through a specific channel in a communication system which imposes constraints on the propagation delay time, and to perform communications through channels other than the specific channel in a communication system in which there is no constraints on the propagation delay time.

Conventionally, in the system shown in FIG. 1, in areas other than the communication area A, communications imposing constraints on the propagation delay time have been impossible. However, when specific channel CRFs $4_1$ and $4_2$ are inserted at intermediate points of the transmission path 1, communications imposing constraints on the propagation delay time becomes possible between communication units in the respective communication areas B and C.

FIG. 7 is a block diagram showing the internal construction of the specific channel CRF 4. The CRF 4 comprises a filter 4a on the side of the all-channel CRF 3, a transmission channel branching filter 4b, a receiving multiplex channel unit 4c, a terminal side transmission and receiving unit 4d, and a frequency converter 4e. The filter 4a sends a transmission signal of frequency $f_5$ supplied from the transmission channel branching filter 4b to transmission path 1a on the side of the CRF 3, eliminates a signal of frequency $f_4$ of received signals having frequencies $f_4$ and $f_6$ supplied from the transmission path 1a on the side of the CRF 3, and supplies only the received signal of frequency $f_6$ to the receiving multiplex channel unit 4c. The transmission channel branching filter 4b supplies the transmission signal of frequency $f_3$ among transmission signals having frequencies $f_3$ and $f_5$ supplied from the terminal side transmitting and receiving unit 4d to the frequency converter 4e, and supplies the transmission signal of frequency $f_5$ to the filter 4a on the side of CRF 3. The receiving multiplex channel unit 4c multiplexes a receiving signal of frequency $f_4$ supplied from the frequency converter 4e and the receiving signal of frequency $f_6$ supplied from the filter 4a to form receiving signals of frequencies $f_4$ and $f_6$ which are supplied to the terminal side transmitting and receiving unit 4d.

The terminal side transmission and receiving unit supplies to the transmission channel branching filter 4b the transmission signals of frequencies $f_3$ and $f_5$ supplied through the transmission path 1b, and sends to the transmission path 1b receivced signals of frequencies $f_4$ and $f_6$ supplied from the receiving multiplex channel 4c. For this reason, the specific channel CRF 4 functions to send out as a receiving signal of frequency f4 to the transmission path 1b the transmission signal of frequency $f_3$ among transmission signals of frequencies $f_3$ and $f_5$ supplied from the transmission path 1b, to eliminate the receiving signal of frequency $f_4$ among received signals of frequencies $f_4$ and $f_6$ supplied from the transmission path 1a on the side of the CRF 3, and to send out only the receiving signal of frequency $f_6$ to the transmission path 1b.

The embodiment described above has a performance of eliminating a receiving signal of the frequency of $f_4$ supplied from the transmission path 1a on the side of the CRF 3 so as not to send out the receiving signal to the transmission path 1b, and a performance of not sending to the transmission path 1a on the side of the CRF 3 the transmission signal of frequency $f_3$ supplied from the transmission path 1b, but only one of both the performances is sufficient.

Figure 9:
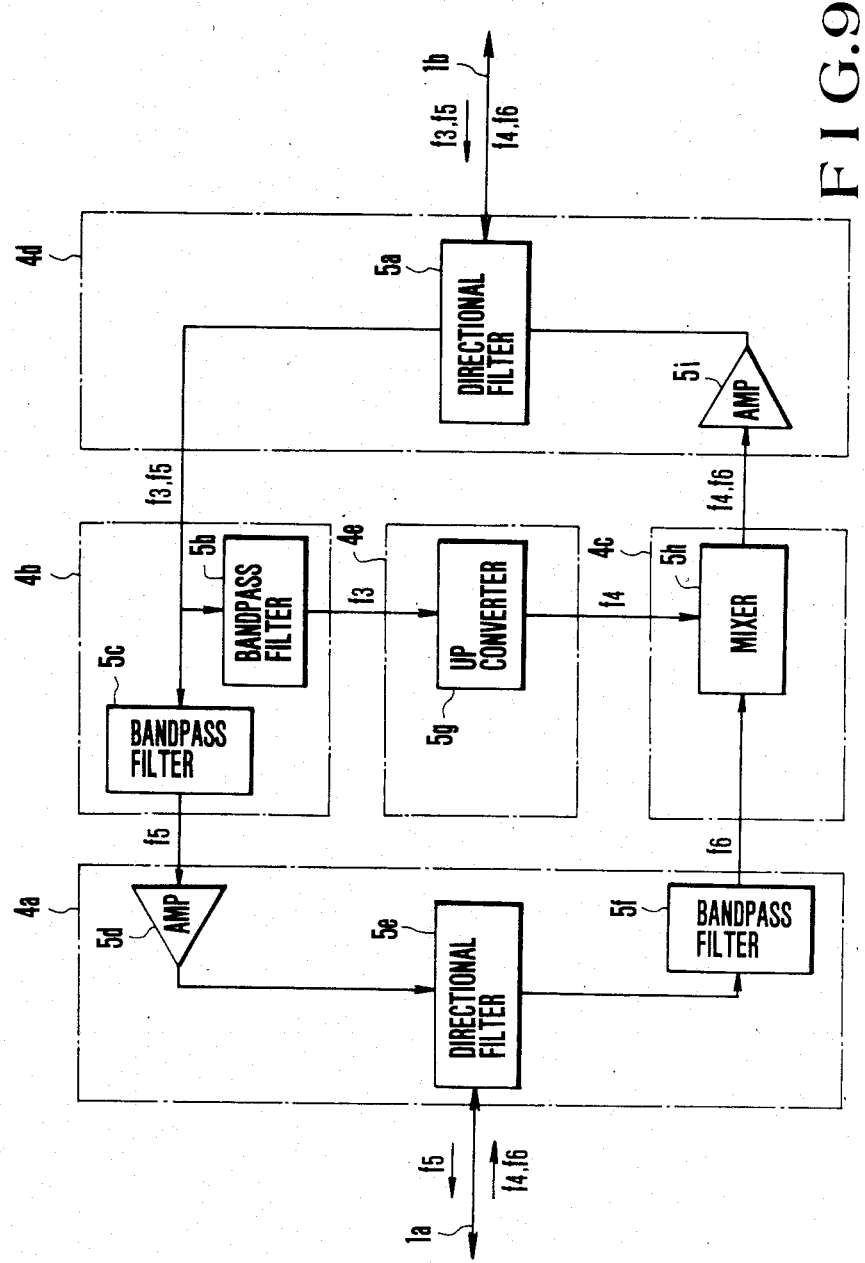
FIG. 9 is a block diagram showing details of an intermediate specific channel CRF for use in the one line type mid-split type.
Figure 10A:
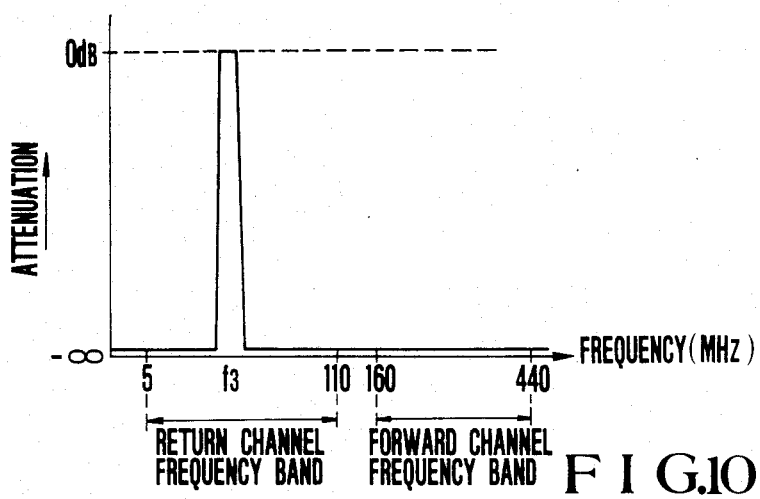
FIGS. 10a, 10b and 10c show ideal characteristics of three bandpass filters.
Figure 10B:
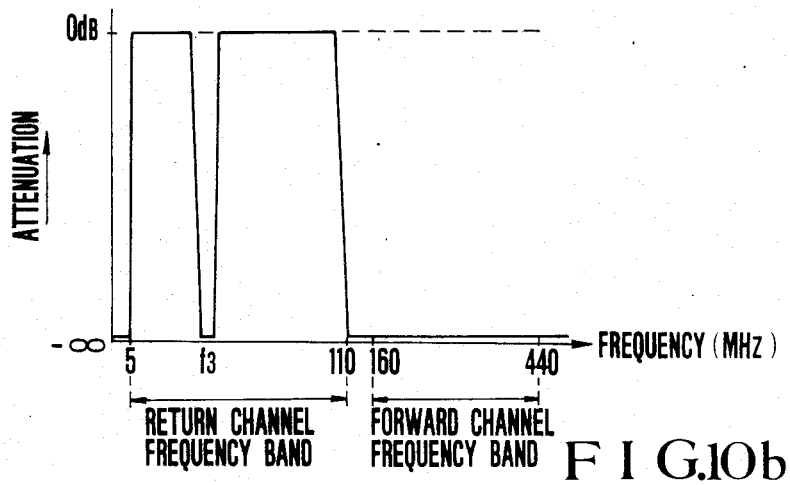
Figure 10C:
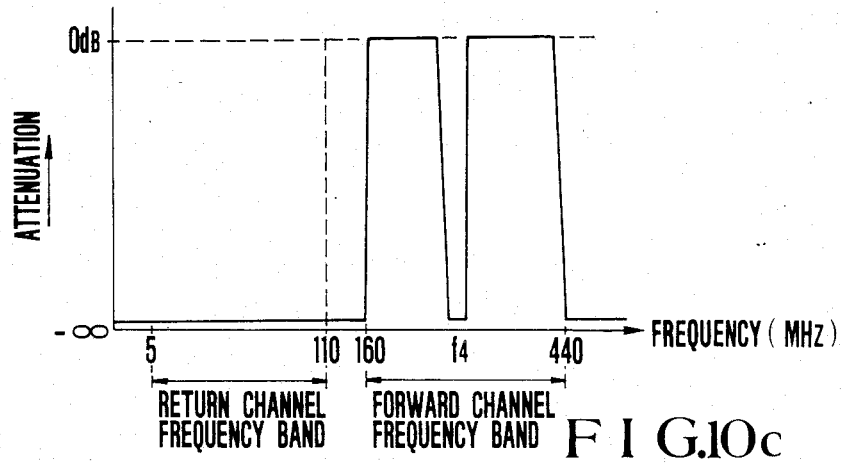

FIG. 9 is a block diagram showing one example of a specific channel CRF utilized in a mid-strip system. In this system, frequencies of 5 to 110 MHz are assigned to a return channel, while frequencies of 160 to 440 MHz are assigned to a forward channel. A return channel signal received from the terminal side transmission path 1b is filtered by a directional filter (DF) 5a and then sent to the transmission channel branching filter 4b in which the signal is filtered by bandpass filters of two types. The signal of the channel frequency $f_3$ filtered by a bandpass filters 5b having a filtering characteristic as shown in FIG. 10a is sent to the frequency converter 4e. The channel frequencies other than the frequency $f_3$, typically represented by $f_5$, are filtered by a bandpass filter 5c having a filtering characteristic as shown in FIG. 10b. The signal of frequency $f_5$ is amplified by an amplifier 5d and then sent out to the transmission path 1a on the side of the CRF 3 as a return channel signal via DF 5e. A forward channel signal inputted from the transmission path 1a is filtered by a bandpass filter 5f having a filtering characteristic as shown in FIG. 10c, so that only signals of forward channel frequencies other than $f_4$, typically represented by $f_6$, are passed and sent to the receiving multiplex channel unit 4c. The frequency of the signal from the bandpass filter 5b is increased from specific return channel frequency $f_3$ to specific forward channel frequency $f_4$ by an up-converter 5g of the frequency converter 4e, and is sent to the receiving multiplex channel unit 4c.

Signals having frequencies $f_4$ and $f_6$ are mixed together by a mixer 5h of the receiving multiplex unit 4c, and after being amplified by an amplifier 5i the multiplexed signal is sent to the terminal side transmission path 1b as forward channel signal via DF 5a.

In this case, as in the precedence, the specific channel CRF may selectively have either a performance of eliminating a received signal of frequency $f_4$ supplied from the transmission path 1a on the side of the CRF 3 so as not to transmit the signal to the transmission path 1b, or a performance not to send to the transmission path 1a on the side of the CRF 3 a transmission signal having a frequency of $f_3$ supplied from the transmission path 1b. Accordingly, the provision of either one of the bandpass filters 5b and 5c may be possible.

FIGS. 10a, 10b and 10c show ideal characteristics of three bandpass filters 5b, 5c and 5f for use in the mid-strip system. The bandpass filter 5b passes only the signal of specific return channel frequency f3, the bandpass filter 5c passes only the return channel signal of the frequency other than frequency $f_3$ and the bandpass filter 5f passes only the forward channel signal of the frequency other than the specific forward channel frequency f4. In FIGS. 10a, 10b and 10c, the abscissa represents frequency in MHz, and the ordinate the attenuation caused by filters in dB.

FIG. 4 is a block diagram showing an embodiment of this invention for use in a two-line type broadband network system, in which elements corresponding to those shown in FIG. 2 are designated by the same reference characters. In FIG. 4, numeral $14_1$ designates a specific channel CRF for use in a communication units in area B, and $14_2$ designates a specific channel CRF for use with a communication units in area C. Since the return channel and the forward channel are constructed by separate transmission paths, it is not necessary to convert the frequency at the time of returning the signal. The specific channel CRFs $14_1$ and $14_2$ have the same performance as that of the one line type specific channel CRFs $4_1$ and $4_2$ except that the return channel and the forward channel send signals of the same frequency to the separate transmission paths.

In FIG. 6, it is supposed that there are two communication units $12b_1$ and $12b_2$ in the communication area B, that there is a communication unit 12a in the communication area A, that the frequency of transmission signal of a specific channel sent out from each communication unit is typically represented by $f_{13}$ and the frequency of the channels other than the specific channel is typically represented by $f_{15}$.

In this system, when a transmission signal having a frequency of $f_{13}$ is sent out to the return channel transmission path 11b from the communication unit $12b_2$, this signal is returned by the specific CRF $14_1$ without changing its frequency $f_{13}$ and then received by the communication unit $12b_1$ via the forward channel transmission path $11d$. In this case, the propagation delay time between transmitting and receiving points is equal to the sum of the propagation delay time between the communication unit $12b_2$ and the specific channel CRF $14_1$, and the propagation delay time between the specific channel CRF $14_1$ and the communication unit $12b_1$, so that in the same manner as in the one line type, a network imposing constraints on the propagation delay time can be used by inserting the specific channel CRF 14 in a transmission path 11.

Figure 8:
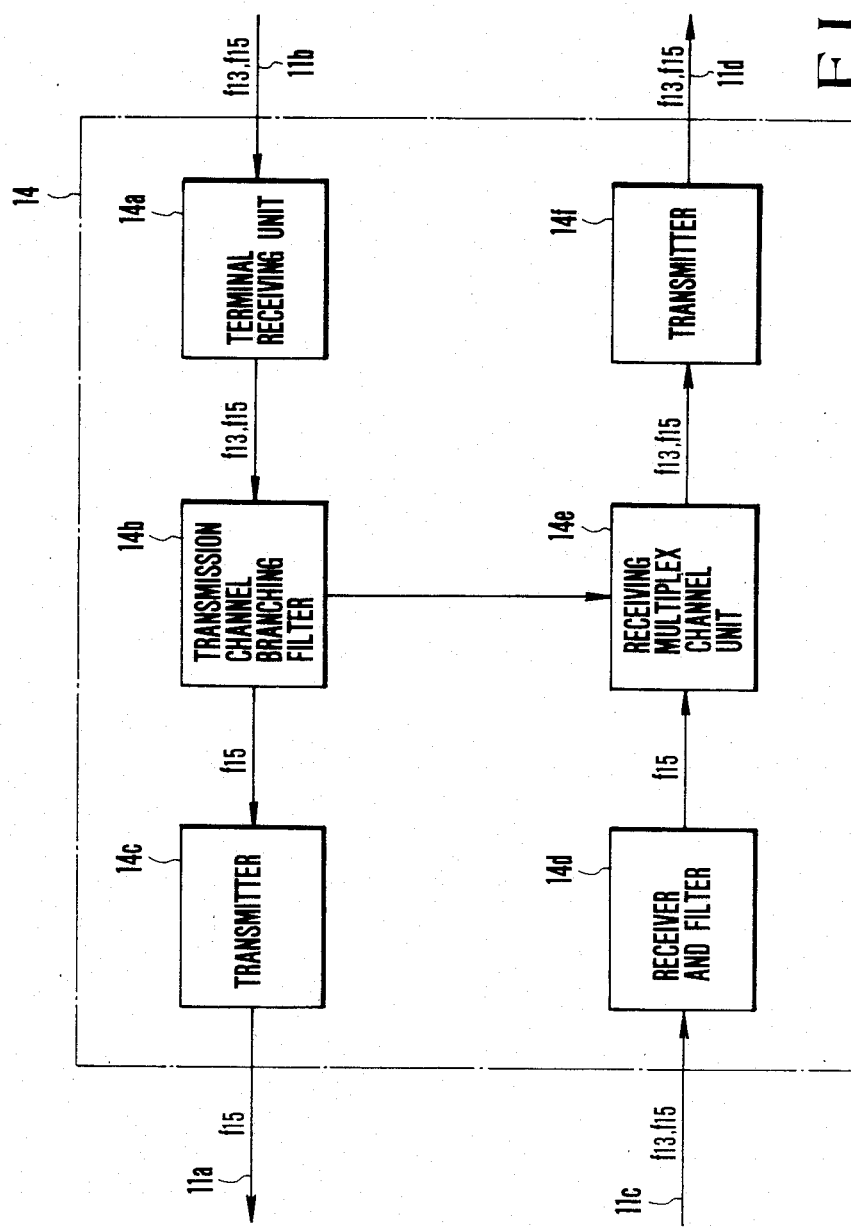

FIG. 8 is a block diagram showing the construction of the two-line type specific channel CRF 14. A signal from the return channel transmission path on the terminal side is received by a terminal receiving unit $14a$ and then sent to a transmission channel branching filter $14b$. Like the one line type, the transmission channel branching filter $14b$ distributes the signal respectively having specific channel frequencies $f_{13}$ and $f_{15}$. The signal of frequency $f_{15}$ is sent to the return channel transmission path $11a$ on the side of the CRF 13 via a transmitting unit $14c$ on the side of the all-channel CRF 13. Different from the one line type, the signal of frequency $f_{13}$ is sent to the receiving multiplex channel unit $14e$ without being changed in its frequency.

A signal from the forward channel transmission path $11c$ on the side of the CRF 13 is received by a receiver and filter $14d$ on the side of the CRF 13, and only a specific channel frequency $f_{13}$ is cut off, while the signal having a frequency represented by $f_{15}$ is passed as it is and then sent to a receiving multiplex channel unit $14e$. Signals of the frequencies $f_{13}$ and $f_{15}$ are mixed together by the receiving multiplex channel unit $14e$ and the mixed signals are sent to the terminal side forward channel transmission path $11d$ via the terminal side transmitting unit $14f$.

Like the one line type, the two-line type specific channel CRF may selectively eliminate a signal of specific channel frequency $f_{13}$ supplied from the forward channel transmission path $11c$ on the side of the CRF 13 so as not to send the signal to the forward channel transmission path on the terminal side, or prevent sending of a transmission signal having a frequency of $f_{13}$ and supplied from the return channel transmission path $11b$ on the side of the terminal to the return channel transmission path $11a$ on the all channel side.

As described above, insertion of a specific channel CRF in a broadband transmission path permits realization of a network imposing constraints on the propagation delay time in the same area, but communications between different communication areas must be effected through channels other than the specific channel in either case of one line type or two-line type.

FIGS. 11 and 12 show embodiments of the invention wherein communications between different network or communication areas are improved.

In FIG. 11, reference characters A, B and C represent communication areas of which area A contains communication units 21-11 through 21-14. In the same manner, 22-11 to 22-14 and 23-11 to 23-14 represent communication units in the communication areas B and C, respectively. But it should be understood that four units are not always necessary in each communication area. In the case of a network imposing constraints on the propagation delay time for each communication area, the specific channel CRF described above is used so as to communicate through a specific channel frequency. In a network having no constraints, communications are made through channels of frequencies different from the specific channel frequency. In FIGS. 11 and 12, the specific channel CRF is not shown.

In FIG. 11, reference characters 21-20, 22-20 and 23-20 represent internetwork connecting devices belonging to areas A, B and C, respectively. Inter-area communications are made by using discrete frequency channels in a baseband network in which the propagation delay time is not influenced appreciably.

In FIG. 12, elements corresponding to those shown in FIG. 11 are designated by the same reference characters. Reference characters 21-21, 21-22, 22-21, 22-22, 23-21 and 23-22 designate internetwork connecting devices respectively connected to the baseband networks in areas A, B and C.

The operation of the embodiments shown in FIGS. 11 and 12 will now be described.

Respective internetwork connecting devices 21-20 (FIG. 11), 21-21 and 21-22 (FIG. 12); 22-20 (FIG. 11), 22-21 and 22-22 (FIG. 12); 23-20 (FIG. 11), 23-21 and 23-22 (FIG. 12) collect communications of respective sets of communication units 21-11 to 21-14; 22-11 to 22-14; and 23-11 to 23-14 respectively connected to baseband stations A, B and C to which the network interconnecting devices belong, thereby effecting communication with the groups of the other baseband networks.

More particularly, in each baseband network group, each internetwork connecting device is graded to be one communication unit so that when a baseband communication unit of a given baseband group transmits signals to the groups of the other baseband group, data is transmitted to their internetwork connecting devices and response is received therefrom. In response to address information added to the data sent from the communication unit in a baseband network to which an internetwork connecting device belongs, the internetwork connecting device sends the data to the other baseband network groups.

For the other data sent from other baseband groups, in accordance with address information added to the data, the internetwork connecting device transmits the data to the communication unit in a baseband network to which the internetwork connecting device belongs.

Communications between internetwork connecting devices, i.e. among respective baseband groups, are made in the following manner.

Firstly, in FIG. 11, n:n communications are made among the internetwork connecting devices 21-20, 22-20 and 23-20 through the fourth broadband channel.

More particularly, in FIG. 11, the communications between internetwork connecting devices 21-20 and 22-20 are made by using the fourth broadband channel, the communications between the internetwork connecting devices 22-20 and 23-20 are made by using the fifth broadband channel and the communications between the internetwork connecting devices 23-20 and 21-20 are made by using the sixth broadband channel.

Turning now to FIG. 12, communications between internetwork connecting devices 21-22 and 22-21 are made by using the fourth broadband channel, communications between internetwork connecting devices 22-22 and 23-21 are made by using the fifth broadband channel, and communications between the internetwork connecting devices 23-22 and 21-22 are made by using the sixth broadband channel.

Although in the foregoing embodiments the number of the baseband networks was three, the invention is not limited to this number, and the number may be 2, 4 or more.

As described above, according to this invention, a specific channel CRF that sends back only signals of a specific channel but permits bidirectional free pass of the signals of the other channels is inserted at an intermediate point of a trnasmission path so that it becomes possible to use, at any point of the transmission path, a communication system imposing constraints on the propagation delay time which could otherwise be used only near an all-channel CRF for sending back all channels. Furthermore, according to this invention, to effect communications among respective areas, it becomes possible with a simple construction of connecting a baseband network and an internetwork connecting device to a broadband transmission path to effect communications between baseband networks by the utilization of other channels by the internetwork connecting device when the communication distance is extended over a distance over which the baseband network can communicate.

What is claimed is:

1. A broadband network system comprising:
a communication path having a first and a second end;
a plurality of specific network areas disposed along said communication path, each of said areas including a plurality of communication units that are adapted to transmit and receive signals and are connected in parallel to said communication path in a frequency multiplexed communication system, and each of said areas having constraints on a permissible value of propagation delay time for communications between the communication units;
an all-channel CRF connected to said first end of the communication path for receiving transmitted signals sent from the communication units, for converting the transmitted signals into forward signals and for sending the forward signals to said second end of the communication path; and
an intermediate specific channel CRF, located between each adjacent tow of the specific network areas along the communication path, for receiving all transmitted signals then on said communication path, for converting a specific transmitted signal sent from a first side of the specific channel CRF into a specific forward signal, for sending said forward signal to the communication path on said first side of the specific channel CRF, and for preventing either a specific transmitted signal from said first side of the specific channel CRF from being sent to a second other side of the specific channel CRF or a specific forward signal supplied from said second other side of the specific channel CRF from being sent to the first side of the specific channel CRF.

2. A broadband network system comprising:
a communication path having a first end and a second end, and comprising a plurality of first channels and a plurality of second channels,
a plurality of communication areas disposed along said communication path, each of said areas including a plurality of communication units that are adapted to transmit and receive signals, each of said areas having a different first communication channel, respectively, and each of said areas being adapted for communication among said communication units in said area through its corresponding first communication channel; and
a plurality of connecting devices, at least one being included in each said communication area, all said connecting devices and said communication units in an area being connected in parallel to said communication path, at least one of said connecting devices in a first area being paired with at least one connecting device in a second area, each of said pair of connecting devices being assigned different second communication channels, respectively, and each said pair of connecting devices being adapted for communication through its corresponding second communication channel.

* * * * *